June 5, 1956 — A. T. DEUTSCH — 2,748,933
AUTOMATIC EXTRUSION PRESSES
Filed Jan. 27, 1955
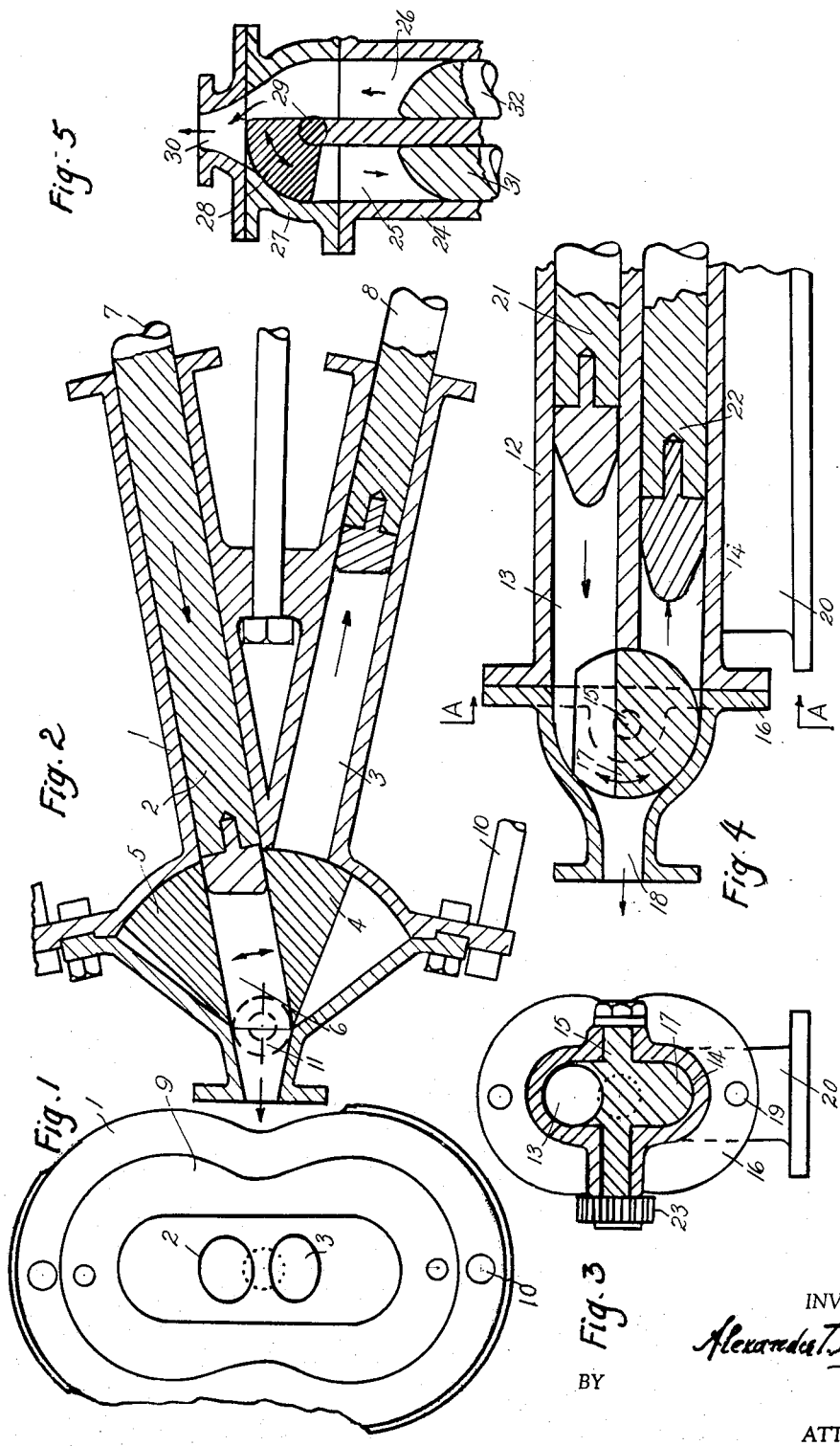
INVENTOR
Alexander T. Deutsch
BY
ATTORNEY United States Patent Office 2,748,933
Patented June 5, 1956

2,748,933

AUTOMATIC EXTRUSION PRESSES

Alexander T. Deutsch, Cincinnati, Ohio

Application January 27, 1955, Serial No. 484,512

5 Claims. (Cl. 207—9)

Matter of this invention is a development of U. S. Patent 2,620,922 of 1952 concerning automatic hydraulic extrusion press.

It is of importance that the pivotally mounted valve-means, used in these extrusion-presses (injection-molding of plastics, die-casting, coating of cables, extrusion of electrodes, structures, pipes and others from steel, metals, plastics, ceramics, tough-stiff-glass and many others) operate in a nearly pressureless chamber, evacuated or under a controlled atmosphere (argon, helium or others), so that oxidation at the welding joints in the extrusion chamber are avoided; further that the material is ejected without essential change of direction, which might cause cracks or breaks, and finally that the whole pressure line, that is from the container (press-cylinder) through the valve-bore into the extrusion chamber adjacent to the die, can be cleaned at the end of the said extrusion process (for example the end of the days shift); this by the plunger which can move all the way through the container and valve-bore into the extrusion chamber. This way all material can be cleaned out of the pressure line.

All this is achieved by this new development. It is achieved by using the same bore in the swinging or rotating valve-means as it is provided for the plunger movements in the containers, which can be established under angles to the axis of the die or in any other, which allows a full lining up of the containers with the bore (or several bores) of the said valve means in the corresponding positions; this way the axis of the container in action lines up with the axis of the bore of the valve means, whereby locking devices can be used.

While the shooting plunger ejects the material from the container through the lined up valve bore into the extrusion chamber, the other container (or containers), after return of the plunger, fills new material in, fed by the alternating pre-heater, which is located adjacent to the containers; during this period the valve means close the bore of the filling container. The valve-means are advantageously shaped as rotation bodies; locking devices can be stops, cams, eccentrics or others, also in combination with the drive (valve-means rotation).

The arrangement of the containers in V-form (axes inclined to die-axis) allows the extrusion of wide and thin shapes (sheets and others) and prevents the back-flow of material after cessation of pressure.

Figures 1–5 illustrate some examples, but the inventions limits are presented only by the state of the art.

Fig. 1 is a side-view, Fig. 2 a longitudinal section through the press, the valve removed in Fig. 1. Fig. 3 is a cross-section through Fig. 4 (A—A), which is a longitudinal section through press Fig. 3. Fig. 5 shows a valve, pivoted at the containers end.

In Figs. 1 and 2 1 is the frame, embodying containers 2 and 3, 4 the lower, 5 the upper portion of the valve with the bore 6, 7 and 8 the plungers working within the respective containers 2 and 3, 9 is the valve chamber, 10 distance and stress-absorbing-columns, as usual at heavy hydraulic presses, 11 the valve pivot, here at the extrusion-(die-) chambers entrance. The diameter of the bore 6 is substantially the same as the inside diameter of the container, all containers, with which it has to line up for successive extrusion.

The containers are alternately fed from the pre-heater (not shown), placed above them. Careful temperature control, penetrating heating (electronic) is recommended. Ingots, granulated, power-like material, slabs, billets or others can be used for pre-heating. The material can be fed fully plasticized into the container or semi plastic, to be plasticized in the valve. The choice has to do with good valve-locking-means and the type of raw material available. Anyway in these presses the plunger can push all the way through the container into the die, just to remove residues. The feeding of the material can be arranged automatically through the nozzle or, if need should be as in injection molding presses, also through the plungers center or through the sides of the press. These machines can be relatively short, fast working, and time saving. The plungers can be provided with insulators at the contact surfaces, though the whole of the inner working surfaces may be provided with coatings, as from silicates or others. The valve actually moves in a pressureless or at least an oxide-free chamber, evacuation-means provided. The V form arrangement of the presses (their axes inclined to the dies axis) is practical also for the extrusion as flat structures as sheets, plates or others. They provide an even flow without turbulence and prevent a material backflow when pressure ceases.

In Figs. 3 and 4 12 is the frame embodying the containers 13 and 14, 15 the swinging valve pivot, 16 the valves (chamber) casing, 17 the valve, 18 the extrusion chamber, 19 the distance columns, 20 the machines support, 21 and 22 the respective plungers, and 23 the valve drive. The valve drive (rotation, swinging) can be initiated from its shaft, which can also contain a cam-locking device, or from its sides. It can be continuous or intermittent, dependent on the choice of work. Intermittent, automatic gearing will provide more accurate extrusion and less wear. Eventually the material pressure itself can steer the valve, if indirect, that is direction changing extrusion would be acceptable (for specific materials).

In Fig. 5 24 is the frame embodying the containers 25 and 26, 27 the valve casing, 28 the valve itself, pivoted at the containers (frame) end 29, 30 the extrusion chamber, 31 and 32 the plungers within the containers 25 and 26. After the plunger has pushed all material through the valve bore (see also Fig. 3, valves bore), the valve actually swings in a pressureless chamber).

Any heating and temperature control devices may be employed. This invention is intended to advance automation in the field of extrusion. The extrusion-method, recommended here, will provide homogeneous, organic material flow during the process, as well as correct dimensions, smooth surfaces and strong structures. It is a progress compared with the old forging process, which this inventor believes to have a little advanced with his description of the prefill-valve for fast-working hydraulic forging presses (see Foerdertechnik und Frachtverkehr, Berlin, 1928, die Hydraulischen Schmiedepressen).

I claim:

1. In a continuous extrusion apparatus having a frame, a plurality of extrusion-containers and an extrusion-die mounted on said frame, walls forming a valve-controlled extrusion-chamber adjacent the mouth of the die, a movably mounted valve-means operatively mounted between said extrusion-chamber and said containers, said valve means comprising a pivotally mounted member having at least one cylindrical bore therethrough, said bore having substantially the same diameter as the said containers, said member pivotally shiftable in order to selectively and axially align said bore with said extrusion-containers, respectively to selectively present a continuous smooth and straight passageway between the said extrusion-chamber and each of the said containers.

2. In a continuous extrusion apparatus having a frame, a plurality of extrusion-containers and an extrusion-die mounted on said frame, walls forming a valve-controlled extrusion-chamber adjacent the mouth of the die, a movably mounted valve-means operatively mounted between said extrusion-chamber and said containers, said valve-means comprising a pivotally mounted member having at least one cylindrical bore therethrough, said bore having substantially the same diameter as the said containers, said member pivotally shiftable in order to selectively and axially align said bore with said extrusion-containers, respectively to selectively present a continuous smooth and straight passageway between the said extrusion-chamber and each of the said containers, the axes of which can be also inclined (V-form) to the axis of the extrusion-chamber (die).

3. In a continuous extrusion apparatus having a frame, a plurality of extrusion-containers and an extrusion die mounted on said frame, walls forming a valve controlled extrusion-chamber adjacent the mouth of the die, a movably mounted valve-means operatively mounted between said extrusion-chamber and said containers, said valve-means comprising a pivotally mounted member having at least one cylindrical bore therethrough, said bore having substantially the same diameter as the said containers, said member being pivotally shiftable in order to selectively and axially align said bore with said extrusion-containers, respectively to selectively present a continuous smooth and straight passage-way between the said extrusion-chamber and each of the said containers, the axes of which can be also inclined to the axis of the extrusion-chamber, whereby the atmosphere within the valve-means and the extrusion-chamber can be controlled.

4. In a continuous extrusion-apparatus having a frame, a plurality of extrusion-containers and an extrusion-die mounted on said frame, walls forming a valve-controlled extrusion-chamber adjacent the mouth of the die, a movably mounted valve-means operatively mounted between said extrusion-chamber and said containers, said valve-means comprising a pivotally mounted member having at least one cylindrical bore therethrough, said bore having substantially the same diameter as the said containers, said member pivotally shiftable in order to selectively and axially align said bore with said extrusion-containers, respectively to selectively present a continuous smooth and straight passage-way between the said extrusion-chamber and each of the said containers, and locking devices between the said valve-means and the said frame.

5. In a continuous extrusion apparatus having a frame, a plurality of extrusion-containers and an extrusion-die mounted on said frame, walls forming a valve-controlled extrusion chamber adjacent the mouth of the die, a movably mounted valve-means operatively mounted between said extrusion chamber and said containers, said valve-means comprising a pivotally mounted member having at least one cylindrical bore therethrough, said bore having substantially the same diameter as the said containers, said member being pivotally shiftable in order to selectively and axially align said bore with said extrusion-containers, respectively to selectively present a continuous smooth and straight passage-way between the said extrusion-chamber and each of the said containers, the axes of which can be also inclined to the axis of the extrusion-chamber, a pre-heater, which alternatively feeds the containers, located adjacent to the said containers.

References Cited in the file of this patent

UNITED STATES PATENTS

| 338,561 | Shaw | Mar. 23, 1886 |
| 504,687 | Winsor | Sept. 5, 1893 |
| 1,177,097 | Garretson | Mar. 28, 1916 |
| 2,181,987 | Beaver et al. | Dec. 5, 1939 |
| 2,620,922 | Deutsch | Dec. 12, 1952 |

FOREIGN PATENTS

| 859,467 | France | Dec. 19, 1940 |